United States Patent [19]

Merrell

[11] Patent Number: 5,060,682

[45] Date of Patent: * Oct. 29, 1991

[54] LYOPHOBIC DETACKIFIERS

[75] Inventor: Gene A. Merrell, Tomball, Tex.

[73] Assignee: Laboratories, Inc. Betz, Trevose, Pa.

[*] Notice: The portion of the term of this patent subsequent to Jun. 26, 2007 has been disclaimed.

[21] Appl. No.: 592,763

[22] Filed: Oct. 4, 1990

[51] Int. Cl.$^5$ ................................................ B08B 9/00
[52] U.S. Cl. ...................................... 134/38; 210/712; 210/732; 210/736; 252/181; 252/175; 252/319; 252/DIG. 8
[58] Field of Search ................... 134/38; 252/181, 175, 252/319, DIG. 8; 210/712, 732, 736

[56] References Cited

U.S. PATENT DOCUMENTS

| | | | |
|---|---|---|---|
| 3,990,869 | 11/1976 | Forney | 55/19 |
| 4,067,806 | 1/1987 | Mauceri | 134/38 |
| 4,440,647 | 4/1984 | Puchalski | 134/38 |
| 4,600,513 | 7/1986 | Mizutani et al. | 210/712 |
| 4,637,824 | 1/1987 | Pominville | 134/38 |
| 4,656,059 | 4/1987 | Mizuno et al. | 427/345 |
| 4,686,047 | 8/1987 | Arots | 210/736 |
| 4,937,003 | 6/1990 | Merrell | 55/85 |

Primary Examiner—Theodore Morru
Assistant Examiner—Zeinab El-Arini
Attorney, Agent, or Firm—Alexander D. Ricci; Gregory M. Hill

[57] ABSTRACT

A process for detackifying paint in a wet paint spray booth wherein water is used to wash the air containing oversprayed paint from the paint spray operation. The process comprises forming stable colloid solutions consisting of weakly electropositive metals. Additionally, to activate the metal cation, various anionic or cathionic polymers may be selected and used.

4 Claims, No Drawings

LYOPHOBIC DETACKIFIERS

FIELD OF THE INVENTION

This invention relates to paint spray booths and methods of treating the paint oversprays and wastes generated during the operation of the paint spray booth.

BACKGROUND OF THE INVENTION

The spray painting of automobile bodies, truck engines, appliances and other industrial goods is customarily carried out in enclosed areas called paint spray booths (PSB). These booths act to contain solvent fumes and oversprayed paint and to reduce the chances of dust, contamination in order to protect the paint booth operators. These booths vary in size, but are somewhat basic in their design and operation. A typical booth would thus consist of a work area, back section with mist eliminators and a sump.

The units to be painted generally pass through the work area while an air flow makes the oversprayed paint contact either the sump water or the spray from the water curtain. The air is scrubbed with recirculated water at the water curtain, passes through the mist eliminators and is removed by an exhaust fan.

Even though paint transfer efficiencies have increased through improved application technologies, roughly one-half of all paint sprayed does not reach its intended article. As a result, a significant concentration of paint builds in the system and agglomeration can occur. The resultant mass is a sticky, tacky material which can plug the mist eliminators, shower heads and even recirculating pumps. When this happens, scrubbing efficiency decreases leading to potentially hazardous conditions of unchecked paint emissions being discharged into the atmosphere. Such conditions may also present severe safety hazards to paint spray booth operators.

These tacky organic deposits are subject to bacterial growth and the proliferation of fungi. These conditions generate corrosion and odor problems. In addition, the paint solids that are recirculated can form suspensions in the water which remain tacky and can create expensive separation and disposal problems.

These problems show, therefore, the desirability to treat PSB water systems so as to reduce or prevent as much as possible the agglomeration and deposition of oversprayed paint on critical PSB operating parts, to render the resultant sludge non-tacky and easily removable and to provide a water quality such that it can be recycled for use in the system.

Numerous paint detackification programs are known. Some paint spray booth operations utilize an activator catalyzed detackification program (ACDP). Within ACDP technology, an anionic species, such as a silicate, activates, or catalyzes, a cationic organic polymer. The activated organic polymer detackifies oversprayed paint particles present in the wash water. Problems arise, however, with the excessive loss of the activator species as a precipitate due to the common occurrence of increasing acidification of the wash water.

RELEVANT ART

U.S. Pat. No. 4,440,647 (Puchalski) discloses a paint spray booth composition consisting of a polyamide-epichlorohydrin resin, a polymer formed from reacting hexamethylene diamine and ethylene dichloride. An amphoteric metal salt is also added. The pH of the wash water is regulated to basic by the addition of sodium silicate. A similar approach is disclosed in U.S. Pat. No. 4,637,824 (Pominville) in which a paint spray booth detackifier is disclosed where the pH of the wash water is adjusted to between 7 and 12 by an alkali metal silicate. Furthermore, Pominville requires the addition of an amphoteric metal salt and a polydiallyl dimethyl ammonium halide.

There are additional treatment programs similar to Puchalski and Pominville. Mizutani et al, U.S. Pat. No. 4,600,513, disclose a PSB detackifier consisting of an alkali metal zincate added to the wash water along with a cationic amine. U.S. Pat. No. 4,067,806 (Mauceri), a paint spray booth detackifier is disclosed consisting of the addition of an amphoteric metal salt and the polymerization product of diallyl dimethyl ammonium chloride, N-vinyl-2-pyrolidone and acrylamide.

Similarly Forney, U.S. Pat. No. 3,990,869, discloses a paint spray booth detackifier consisting of a cationic polymer added to the wash water along with an amphoteric metal salt and where the pH is adjusted to between 7.5 and 10.5.

U.S. Pat. No. 4,656,059 (Mizuno et al) discloses a colloidal solution of a melamine aldehyde resin with pH adjustment to provide detackification. Other materials are added to improve the performance of the detackifier, such as a surface active agent for improving paint dispersibility, a flocculant for improving solid-liquid separating properties and, most notably, an alkali agent to diminish tackiness.

Commonly assigned U.S. Pat. No. 4,937,003, Merrell et al., discloses a method of detackifying paint comprising forming a lyophobic colloid by combining $Mg^{+2}$ ions with a dimethylamine/epi chlorohydrin and/or polydiallyl dimethyl ammonium chloride. Additionally, $Zr^{+4}$ ion in combination with maleic anhydride and diisobutylene is found to be effective.

GENERAL DESCRIPTION OF THE INVENTION

The present invention avoids the above and other problems commonly experienced during the treatment of oversprayed paint in a spray booth environment.

In activator catalyzed detackification programs, the formation of a precipitate is necessary to the successful application of this technology. The best detackification is obtained when the solid phase is well dispersed in the water. The solid phase is a lyophobic sol (colloidal solution). A lyophobic compound is characterized as being in a colloidal state with a tendency to repel liquids. Degradation of performance occurs when the solid phase begins to coagulate.

It has been discovered in accordance with the present invention that lyophobic sols may be formed from soluble metal salts alone, or in combination with cationic or anionic polymers. The sols so formed require no pH regulation. Paint detackification is successful without pH adjustment or concern over the pH fluctuation which has proved to be troublesome for state of the art paint detackification treatment programs.

DETAILED DESCRIPTION OF THE INVENTION

It is an object of the present invention to provide a paint spray booth treatment program that effectively detackifies paint, provides a paint sludge that is high in solids and of low volume, reduces or eliminates corrosion (such as the chlorides contained in the treatment programs of Forney, Mauceri and Puchalski), and contains no known hazardous ingredients (such as residual free formaldehyde, a carcinogen, contained in Mizuno and Leitz).

It is a further object of this invention to provide a solution to the loss of the silicate anion in an activator catalyzed detackification program, or ACDP. In ACDP, a caustic silicate is used to activate cationic polymers for use as paint detackifiers. The silicate anion from the caustic silicate interacts with the cationic polymer to form a complex species which is responsible for detackification. During the detackification process, the silicate anion is released and becomes available for further cationic polymer activation. This recycling of the silicate anion is the basis for the "catalyzed" terminology.

Silicate is generally not consumed in the detackification process but other avenues of silicate loss exist. These include loss with water removed from the system in the wet sludge, loss through reaction and precipitation with water hardness cations such as calcium and magnesium and loss with system blowdown or drift out the exhaust. These losses can be predicted and partially controlled.

In the commercial application of this technology, however, an unexpected high rate of silicate loss is experienced. This is caused by pH suppression which results from $CO_2$ adsorption by the wash water during the aeration phase. The solubility of silicate is strongly dependent on the pH of the solution. At typical use concentrations, the solution is buffered by the silica to a pH of about 10.3. As the pH of the solution decreases, the concentration of silicate drops as a result of the corresponding reduction in the solubility of silica.

The process according to the present invention overcomes the previously noted problems. The formation of a lyophobic sol, or colloidal solution, is a key element of ACDP technology. The process of the present invention encompasses the formation of colloidal solutions from soluble metal salts. It is well known that lyophobic sols of the hydroxides of weakly electropositive metals, such as iron, aluminum, chromium, tin, thorium, zirconium, etc., can be obtained through controlled hydrolysis of their salts in aqueous solution. The ability of the soluble metal salts to form colloidal solutions is related to the ease at which its cation hydrolyzes. The pKh of various ions, arranged in order of decreasing ease of hydrolysis, is given below:

$$Zr^{+4}(0.22) > Fe^{+3}(2.19) > Al^{+3}(5.14) > Zn^{+2}(9.60)$$

$$Fe^{+2}(10.1) > Mg^{+2}(11.42) > Ca^{+2}(12.70) > Sr^{+2}(13.18)$$

$$Ba^{+2}(13.82) > Li^{+}(13.82) > Na^{+}(14.48)$$

The zirconium ion will readily hydrolize in water forming a colloidal dispersion. This is due to the low pKh of the ion. In the context of ACDP technology, the zirconium ion "self-activates".

Sol formation of the remaining metal cations must be induced. This is accomplished by the addition of an anionic or cationic polymer to a solution containing the metal cation. In the case in which the anionic polymer is used to activate the metal cation, it is believed that the colloids formed are complexes of the metal cation with the anionic polymer. An example of such a polymer is the copolymer of maleic anhydride and diisobutylene. The scope of the invention is not limited to the above polymer and is intended to cover the use of any polymer capable of activating the metal cations to form stable lyophobic sols. In the instance of using cationic polymers, such as either the condensation product of dimethylamine/epichlorohydrin or polydiallyl dimethyl ammonium chloride, or blend thereof, to form effective sols, it is believed that the counter ions from each material act as "activators" for the other material.

EXAMPLES

Jar Testing Procedure

A standard jar testing procedure is used to determine the operable concentration levels of metallic cation or metallic cation/polymer combinations. The practitioner will appreciate that this procedure may be used to determine proper treatment levels on full scale industrial operations.

The general procedure is to add 100 ml of tap water to a 120 ml jar. The treatments are added, and the bottle capped and shaken to mix the contents and coat the internal surfaces of the jar with the treated water. One (1) ml of paint is added to the jar. After vigorous shaking for 30 seconds, a wooden tongue depressor is immersed in the solution and then removed for examination. The following guidelines are used for examining the detackification performance of the treatment.

Fail: Paint forms large tacky globules and/or coating which adheres to the exposed surfaces of the jar and tongue depressor.

Poor: Paint forms agglomerates which are slightly tacky or smeary to touch, or upon crushing. Paint sludge coats the tongue depressor.

Fair: Paint forms granular flocs or globules which adhere to less than 10% of the exposed surface area of the jar or depressor. Sludge may be smeary, but not tacky.

Good: Paint forms particles or globules, some of which appear as specks on less than 1% of the exposed surface area of the jar or depressor. Sludge is neither smeary nor tacky.

Excellent: Paint forms particles which do not adhere to the exposed surfaces of the jar or depressor. The paint sludge may float, sink, or be dispersed in the water.

Tables IA and IB show the jar test results of various polymer/metal ion combinations evaluated on the basis of their efficacy at detackifying an automotive solvent-based color blend paint.

TABLE IA

Copolymer of Maleic Anhydride
and Diisobutylene Metal Ion Combinations
Copolymer concentration is at 125 ppm actives

| Metal ion (Conc.) | Paint detackification @ 100 ppm Ion | Paint detackification @ 1000 ppm Ion |
|---|---|---|
| $Zr^{+4}$ | good-excellent | good |
| $Fe^{+3}$ | good | good-excellent |
| $Al^{+3}$ | good | good |
| $Zn^{+2}$ | fair-good | good |
| $Fe^{+2}$ | fair-good | good |
| $Mg^{+2}$ | fair | fair-good |
| $Ca^{+2}$ | fair | fair-good |
| $Ba^{+2}$ | poor-fair | fair |

TABLE IB

Polymer Blend of Dimethylamine/epichlorohydrin and Diallyl Dimethyl Ammonium Chloride: Metal Ion Combinations
Polymer Blend is at 104 ppm actives

| Metal ion (Conc.) | Paint detackification @ 100 ppm Ion | Paint detackification @ 1000 ppm Ion |
|---|---|---|
| $Zr^{+4}$ | fair | fair-good |
| $Fe^{+3}$ | poor-fair | poor |
| $Al^{+3}$ | poor | poor-fair |
| $Zn^{+2}$ | poor | poor |
| $Fe^{+2}$ | poor-fair | poor |
| $Mg^{+2}$ | poor | poor |
| $Ca^{+2}$ | poor | poor |
| $Ba^{+2}$ | poor | poor |

The zirconium ion exhibits a low pKh. As a result, it readily hydrolyzes in water to form a colloidal dispersion. Jar test results shown in Table II demonstrate the ability of this ion alone to detackify paint. Also shown is its effect on water clarity as indicated by the turbidity values shown. The paint used was a standard automotive solvent based color blend. $Zr(SO_4)_2$ was the source of zirconium.

TABLE II

Zirconium as a Detackifier

| $Zr^{+4}$ (ppm) | Detackification | Turbidity (NTU) |
|---|---|---|
| 5 | poor-fair | 200 |
| 10 | poor-fair | 150 |
| 25 | fair-good | 58 |
| 50 | fair-good | 47 |
| 100 | good | 36 |
| 150 | fair | 120 |
| (blank) | poor | 150 |

The detackification of paint by the solution containing only the $Zr^{+4}$ is important to note. It is evident from this example that detackification takes place at anionic sites on the paint surface. Therefore, as has been shown by the present invention, successful paint detackification occurs where positive charges are concentrated, as in a colloidal formation of positive ions, surfactants, cations or cationic polymers and the like.

The invention encompasses the use of zirconium as a detackifier. It is not contemplated that this ion functions as a flotation aid within the boundaries of this invention. Table III provides evidence of zirconium's ability to detackify while, at the same time, failing as a flotation aid.

The standard jar test procedure defined above was used. To three jars, each defined as Sample A, were added 1600 ppm of disodium silicate and 4% based on paint of a 75:25 blend of dimethylamine/epichlorohydrin: polydiallyl dimethyl ammonium chloride, a conventional ACDP treatment. To three additional jars, each defined as sample B, were added 1600 ppm of disodium silicate and 15% based on paint of a blend of aluminum chloride and hexamethylenediamine still bottoms/ethylene dichloride.

To each of the first two jars in each sample set was added, respectively, 25 ppm of $Zr^{+4}$ and 30 ppm of a conventional acrylamide flotation polymer, available from Betz Laboratories, Inc., commercially as 1187L.

TABLE III

| Sample | Flotation Aid | Turbidity (NTU) |
|---|---|---|
| A | $Zr^{+4}$ | 15 |
| A | 1187L | 10 |
| A | None | 29 |
| B | $Zr^{+4}$ | 45 |
| B | 1187L | 8 |

TABLE III-continued

| Sample | Flotation Aid | Turbidity (NTU) |
|---|---|---|
| B | None | 52 |

Visual inspection of the above test samples showed that zirconium did not promote flotation. In each case the sludge sank. The samples were gravity filtered through porous filter paper and the turbidity measurements were taken on the filtrates.

The detackification qualities of the present invention are not dependent upon monitoring and adjusting the pH of the wash water. The present invention is functional throughout the broad range of pH and is not susceptible to a degradation in efficacy under progressively decreasing pH conditions, which frequently occurs in paint spray booth wash water systems. Incidently, even though the detackification properties of the invention are unaffected by fluctuations in wash water pH, this is not the case with regard to corrosion of system metallic surfaces. The rate of corrosion of these surfaces is very sensitive to pH variations. Consequently, it may be necessary to regulate wash water pH for the singular purpose of limiting corrosion on PSB metallic surfaces.

Although the efficacy of the present invention has been demonstrated by a limited number of metallic ions and polymer combinations, the skilled artisan will appreciate that numerous combinations of metallic ions and polymers will prove effective, in accordance with the invention, for the wide range of paints sprayed in wet paint spray booths.

While this invention has been described with respect to particular embodiments thereof, it is apparent that numerous other forms and modifications of the invention will be obvious to those skilled in the art. The appended claims and this invention generally should be construed to cover all such obvious forms and modifications which are within the true spirit and scope of the present invention.

I claim:

1. A process for detackifying paint, lacquer or enamel in a spray booth in which water is used to wash air in said spray booth for the purpose of removing oversprayed paints, lacquers or enamels from said water prior to the recirculation of said water for further washing of the air in said spray booth comprising adding to said water, without regard to monitoring and adjusting its pH, a sufficient amount of a metal ion selected from the group consisting of $Sr^{+2}$ and $Ba^{+2}$, or water soluble salt thereof, and a sufficient amount of an organic polymer selected from the group consisting of polydiallyldimethyl ammonium chloride, a copolymer of maleic anhydride and diisobutylene and a copolymer of dimethylamine/epichlorohydrin, to activate said metal ion to form a stable lyophobic sol which detackifies and coagulates paint lacquer or enamel in said water.

2. A process for detackifying and coagulating paint, lacquer or enamel in a spray booth in which water is used to wash air in said booth for the purpose of removing oversprayed paint, lacquers or enamels from said water prior to the recirculation of said water for further washing of the air in said spray booth comprising adding to said water a sufficient amount of a $Zr^{+4}$ ion or water soluble salt thereof.

3. A process according to claim 2 wherein pH is not regulated.

4. A process according to claim 2 wherein said $Zr^{+4}$ ion is added to said water in order to maintain a concentration in said water of from about 25 ppm to about 100 ppm.

* * * * *